Aug. 15, 1967
E. S. RUSSEY
3,335,618
TRANSMISSION CONTROL MECHANISM
Filed April 19, 1961
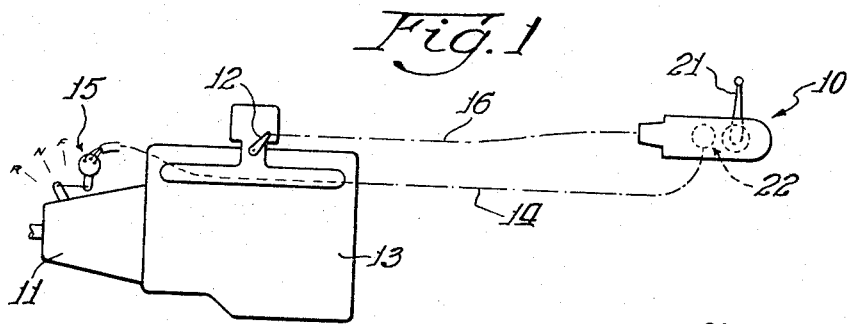
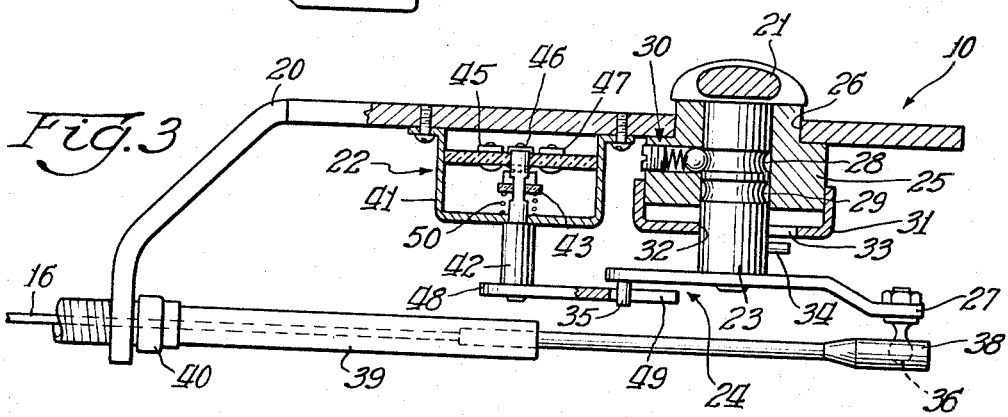
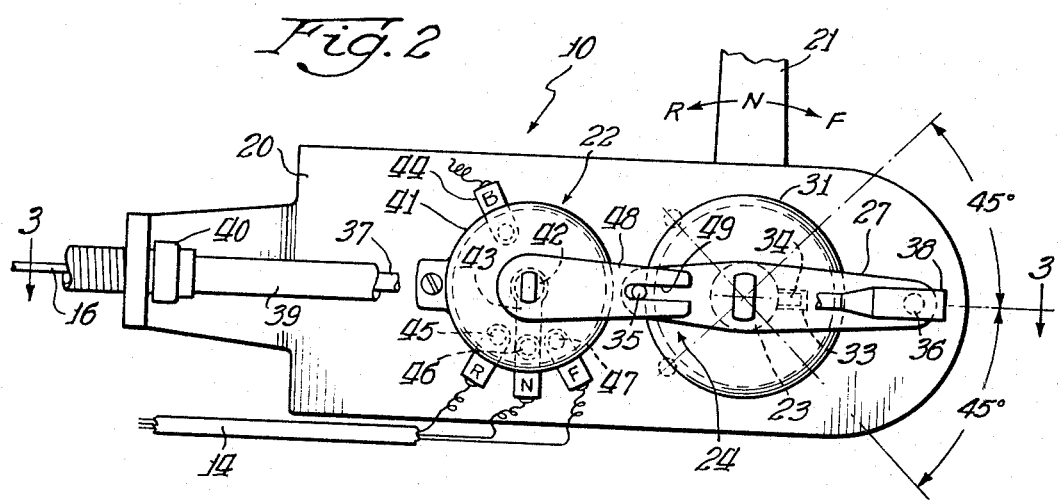
Inventor:
Edward S. Russey
By: Ray E. Snyder
Atty.

United States Patent Office 3,335,618
Patented Aug. 15, 1967

3,335,618
TRANSMISSION CONTROL MECHANISM
Edward S. Russey, Muncie, Ind., assignor to Borg-
Warner Corporation, a corporation of Illinois
Filed Apr. 19, 1961, Ser. No. 104,106
10 Claims. (Cl. 74—472)

This invention relates to a unitary gear shift lever and throttle control mechanism for an engine and transmission combination.

The control mechanism of the present invention is designed primarily for use with a marine engine and transmission but may be utilized in other application where only forward and reverse driving gear ratios are required.

It is an object of the present invention to provide an improved unitary control mechanism for an engine and transmission including a three position electric switch for operating an electric shift motor on the transmission and a lever and cable mechanism for operating the engine throttle.

It is a more particular object to provide a unitary transmission and throttle control mechanism including a three position electric switch means for operating an electric shift motor on the transmission, a lever mechanism including a rotatable shaft having a releasable connection with the switch means, the lever being connected to a flexible cable for controlling the engine throttle, and being rotatable in two planes and movable axially and operable in one plane of rotation to control the engine throttle independently of the transmission switch means.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

FIGURE 1 is a schematic view of the improved control mechanism as used with a transmission and engine;

FIGURE 2 is an enlarged view partially in section of the control mechanism; and

FIGURE 3 is a view taken on line 3—3 of FIGURE 2.

Like characters of reference designate like parts in the several views.

Referring to FIGURE 1, the improved control mechanism of the present invention is designated generally by the numeral 10 and is adapted to control a transmission 11 and a throttle 12 for an engine 13. The control mechanism 10 is interconnected by means of a three conductor cable 14 with an electric shift motor 15 mounted on the transmission 11. The control mechanism 10 is also interconnected by means of a Bowden wire or flexible control cable 16 to the throttle 12.

Referring to FIGURE 2 and 3, the control mechanism 10 comprises a casing or housing 20, a manually operated control lever 21, a three position switch 22, a rotatable control shaft 23, and a linkage mechanism 24 interconnecting the control shaft 23 with the switch 22 and with the Bowden wire 16. The shaft 23 is rotatably disposed within a casing portion 25 which extends through an opening 26 in one wall of the housing 20. The lever arm 21 is attached to the outer end of the shaft 23 and a lever arm 27 is attached to the other end. The shaft 23 is formed with annular grooves 28 and 29 which are adapted to receive a ball detent 30. The shaft 23 has a first axial position in which ball detent 30 is engaged in groove 28 and has a second axial position in which ball detent 30 is engaged in groove 29. An annular cover or cap 31 is fixedly mounted on the casing portion 25 and is formed with an opening 32 through which the shaft 23 extends. The cap 31 is also formed with a radial slot or keyway 33. The shaft 23 carries a radially extending pin 34 which can pass through the slot or keyway 33 when the control lever 21 and shaft 23 are moved axially. The cap 31 is oriented with respect to the casing 25 so as to permit such passage only when the control lever is in neutral or N position.

The lever arm 27 carries a pin 35 for operating the switch 22 and a ball 36 for operating the throttle cable 16. A rigid connecting shaft 37 is attached on one end of the throttle cable 16 and carries a socket 38 on its other end for receiving the ball 36. The connecting shaft 37 is axially slidable within a sleeve 39 which is mounted within the housing 20 by means of a flexible coupling or grommet 40. The coupling 40 permits angular movement of the sleeve 39 and shaft 37 in two dimensions within the housing 20.

The switch 22 is a three position switch of the rotary type and comprises a casing 41, a rotatable shaft 42, a movable contact arm 43, and four contacts or terminals 44, 45, 46 and 47. The terminal 44 is connected to the battery or electrical circuit for the engine and to the movable contact 43. The terminals 45, 46 and 47 correspond to the reverse, neutral, and forward drive positions, respectively of the transmission and are connected by means of the cable 14 to the transmission shift motor 15. The terminal 46 is also interconnected with the engine starting circuit so that the engine can be started only in a neutral position. The rotatable shaft 42 extends through the housing 41 and carries the movable contact arm 43 on one end and a movable arm or fork 48 on the other end. The arm 48 is formed with a longitudinal slot 49 for receiving the pin 35. A spring 50 or detent means may be provided within the casing 41 for releasably holding the contact 43 and shaft 42 in any one of its three selective positions.

Operation

In operation, the control mechanism 10 functions to control the transmission 11 and throttle 12 as follows:

The control lever 21 is moved into the N or neutral position with the shaft 23 in its first axial position with the ball detent 30 engaged in the annular grove 28 for initially starting the engine. To establish forward drive condition, the lever 21 is moved clockwise to the F position. Turning the lever 21 clockwise turns the shaft 23 and arm 27 clockwise and the pin 35 causes the arm 48 to turn counterclockwise so that the movable arm 43 contacts the terminal 47 and energizes the electric shift motor 15 for establishing forward drive condition in the transmission.

The gear shifting operation is accomplished within approximately 45° of rotation. Rotation beyond 45° causes the pin 35 to move out of contact with the slot 49 and the spring 50 holds the arm 48 in position until the control lever 21 is returned to its neutral position. Rotation through the first 45° is insufficient to cause any substantial longitudinal movement of the throttle control cable 16 and consequently has no effect on the throttle. Beyond 45° of rotation, however, the cable 16 is moved longitudinally by a substantial amount and is effective to control the degree of throttle opening roughly proportional to the amount of angular rotation of the lever 21.

Reverse drive condition is established by rotating the control lever 21 counterclockwise into the R position. Rotation through the first 45° is effective to energize the shift motor 15 and cause the gear shift within the transmission 12, and rotation beyond 45° is effective to control the throttle 12 as described before.

When it is desired to operate the engine independently of the transmission, as for example, to race the engine for tune-up, this can be accomplished by moving the control lever 21 axially outward to move shaft 23 to its second axial position so that the ball detent 30 engages the annular groove 29. This motion can be accomplished only in neutral position because the keyway 33 permits passage of the pin 34 only for this condition. Axial movement of the control shaft 23 in this manner causes the pin 35 to lose contact with the arm 48 and the switch 22 therefore is not moved out of the neutral position.

The control lever 21 thereafter can be rotated angularly for any desired amount of throttle opening without shifting the transmission from neutral.

There has been provided by this invention an improved unitary control mechanism effective to control the shift of a forward-reverse transmission and also to control the amount of the degree of throttle opening. The gear shift operation is accomplished during a predetermined amount of angular rotation of the control lever and the throttle opening is controlled by a greater amount of rotation. In addition, provision has been made for permitting the operation of the engine throttle independently of the gear shift control mechanism.

It is to be understood that the invention is not to be limited to the specific constructions, arrangements and devices shown and described, except only insofar as the claims may be so limited, as it will be apparent to those skilled in the art that changes may be made without departing from the principles of the invention.

I claim:

1. A unitary control mechanism for an engine having a throttle and a transmission comprising an angularly rotatable and axially movable shaft, a manual control lever attached to one end of said shaft, a lever arm attached to the other end of said shaft, a gear selector mechanism for the transmission, means defining a releasable connection interconnecting said lever arm with said gear selector mechanism, means defining a throttle control connection attached to said lever arm, and detent means for releasably holding said rotatable shaft for rotation in either of two axial positions, in one of said positions said control lever being effective to operate both said transmission selector mechanism and said throttle, and in the other position of said shaft said control lever being operable to control the engine throttle independently of said gear selector mechanism.

2. A unitary control mechanism for an engine having a throttle and an attached transmission operable to provide a forward drive condition, a reverse drive condition, and a neutral condition and having an electric shift motor operable to selectively establish these conditions, the combination of an axially shiftable and rotatable shaft, detent means for releasably holding said shaft in either of two axial positions, a manual control lever attached to one end of said shaft, a lever arm attached to the other end of said shaft, means including a flexible cable attached to one end of said arm for controlling the engine throttle, a three position electrical switch for controlling the electric shift motor of the transmission, and means defining a releasable connection between said lever arm and said switch whereby in one axial position of said shaft said control lever is effective to control both the transmission and the engine throttle and in the other axial position of said shaft the control lever is effective to control the throttle independently of the transmission.

3. A unitary control mechanism for an engine having a throttle and for a transmission providing forward and reverse drives and a neutral condition and having an electric shift motor for selectively establishing the driving gear ratios, the combination of a rotatable and axially shiftable shaft, a manual control lever attached to one end of said shaft, detent means for releasable holding said shaft in either of two axial positions, electric switch means for controlling the transmission shift motor, means defining a releasable connection between said shaft and said switch means, means interconnecting said shaft with said throttle for controlling it, and means defining a keyway permitting axial movement of said shaft in neutral condition whereby in one axial position of said shaft the transmission and throttle are both controlled and in the second axial position of said shaft the throttle is controlled independently of the transmission.

4. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member and to move said switch actuating means in a reverse direction during the return rotation to neutral of said drive member, and said drive member adapted to disconnect from said switch actuating means during continued rotation of said drive member beyond said first portion of rotation.

5. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch, interconnecting means on said drive member, mating interconnecting means on said switch actuating means, the interaction of said interconnecting means moving said switch actuating means in response to the first portion of rotation from neutral of said drive member and to move said switch actuating means in a reverse direction during the return rotation to neutral of said drive member, and said interconnecting means cooperating to disconnect said drive member from said switch actuating means during continued rotation of said drive member beyond said first portion of rotation.

6. A single lever control unit for the throttle and electrically actuated clutch of an engine comprising a control lever, a drive member rotatable by said control lever from a neutral position to operate a throttle, switch means for energizing and de-energizing said electrically actuated clutch, a switch actuator to operate said switch, interconnecting means on the outer periphery of said drive member, mating interconnecting means on said switch actuator, the interaction of said interconnecting means moving said switch actuator in response to the first portion of rotation from neutral of said drive member, part of said drive member being of lesser radius than the radius of said interconnecting means to provide a space between said drive member and said switch actuator during continued rotation of said drive member beyond said first portion of rotation.

7. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch, interconnecting means between said drive member and said switch actuating means to move said switch actuating means in response to the first portion of rotation from neutral of said drive member and to move said switch actuating means in a reverse direction during the return rotation to neutral of said drive member, and means for providing disconnection between said drive member and said switch actuating means during continued rotation of said drive member beyond said first portion of rotation.

8. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch means, means between said drive member and said switch actuating means to move said switch actuating means in response to the first portion of rotation from neutral of said drive member and to move said switch actuating means in a reverse direction during the return rotation to neutral of said drive member, and means to effect a disconnect between said switch means and said drive member during continued rotation of said drive member beyond said first portion of rotation.

9. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member, means to move said switch actuating means in a reverse direction during the return rotation to neutral of said drive member, and means to effect a disconnect between said switch means and said drive member during continued rotation of said drive member beyond said first portion of rotation.

10. A single lever control unit for the throttle and electrically actuated clutch of an engine comprising a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member, said switch actuating means movable in a reverse direction during the return rotation to neutral of said drive member, and means to effect a disconnect between said switch means and said drive member during continued rotation of said drive member beyond said first portion of rotation.

References Cited

UNITED STATES PATENTS

| | | | |
|---|---|---|---|
| 2,552,001 | 5/1951 | Dugas. | |
| 2,617,311 | 11/1952 | Miller | 192—.098 |
| 2,804,782 | 9/1957 | Erxleben. | |
| 2,957,352 | 10/1960 | Pierce. | |
| 2,966,970 | 1/1961 | Morse | 192—.098 |
| 2,986,044 | 5/1961 | Parsons | 74—72.2 |

DONLEY L. STOCKING, *Primary Examiner.*

MAX L. LEVY, DON A. WAITE, *Examiners.*

L. H. BENDER, H. S. LAYTON, *Assistant Examiners.*